United States Patent
Dervay et al.

(10) Patent No.: US 12,511,304 B2
(45) Date of Patent: Dec. 30, 2025

(54) CONFIGURATION OF APPLICATION DATA OBJECT UPDATES

(71) Applicant: Snowflake Inc., Bozeman, MT (US)

(72) Inventors: Russell Connor Dervay, San Francisco, CA (US); Venkata Satyanarayana Kota, Fremont, CA (US); Kristen Michelle Werner, San Francisco, CA (US)

(73) Assignee: Snowflake Inc., Bozeman, MT (US)

( * ) Notice: Subject to any disclaimer, the term of this patent is extended or adjusted under 35 U.S.C. 154(b) by 9 days.

(21) Appl. No.: 18/753,184

(22) Filed: Jun. 25, 2024

(65) Prior Publication Data

US 2024/0346034 A1 Oct. 17, 2024

Related U.S. Application Data

(63) Continuation of application No. 17/804,660, filed on May 31, 2022, now Pat. No. 12,056,144, which is a continuation of application No. 17/649,415, filed on Jan. 31, 2022, now Pat. No. 11,372,882, which is a
(Continued)

(51) Int. Cl.
| | |
|---|---|
| G06F 16/25 | (2019.01) |
| G06F 8/65 | (2018.01) |
| G06F 9/54 | (2006.01) |
| G06F 16/2455 | (2019.01) |
| G06F 21/62 | (2013.01) |

(52) U.S. Cl.
CPC ............. G06F 16/254 (2019.01); G06F 8/65 (2013.01); G06F 9/547 (2013.01); G06F 16/2455 (2019.01); G06F 21/6218 (2013.01)

(58) Field of Classification Search
CPC ...... G06F 16/254; G06F 16/2455; G06F 8/65; G06F 21/6218; G06F 9/547
USPC ........................................................ 707/602
See application file for complete search history.

(56) References Cited

U.S. PATENT DOCUMENTS

| | | | |
|---|---|---|---|
| 5,878,431 A | 3/1999 | Potterveld et al. | |
| 7,702,639 B2* | 4/2010 | Stanley | G06F 16/20 707/999.1 |
| 8,196,047 B2 | 6/2012 | Fisher et al. | |

(Continued)

OTHER PUBLICATIONS

Louati, Thouraya, et al., "LXCloudFT: Towards high availability, fault tolerant Cloud system based Linux Containers", Journal of Parallel and Distributed Computing, vol. 122, Dec. 2018, pp. 51-69.*

(Continued)

*Primary Examiner* — Robert Stevens
(74) *Attorney, Agent, or Firm* — Schwegman Lundberg & Woessner, P.A.

(57) ABSTRACT

Provided herein are systems and methods for configuring application data object updates. For example, a method includes retrieving, by at least one hardware processor, configuration information associated with an application executing on a first computing node. An authentication of the application is performed based on a secure identifier in the configuration information. An application programming interface (API) is executed to retrieve data from a second computing node based on a successful completion of the authentication. A data object of the application is updated with the retrieved data.

30 Claims, 9 Drawing Sheets

Related U.S. Application Data continuation of application No. 17/463,261, filed on Aug. 31, 2021, now Pat. No. 11,269,913.

(60) Provisional application No. 63/202,801, filed on Jun. 24, 2021.

(56) References Cited

U.S. PATENT DOCUMENTS

| | | | |
|---|---|---|---|
| 9,158,827 | B1 | 10/2015 | Vu et al. |
| 9,445,271 | B2* | 9/2016 | Kim ..................... H04W 12/08 |
| 10,409,825 | B1 | 9/2019 | Gau et al. |
| 10,628,244 | B1* | 4/2020 | Cseri .................. H04L 63/0414 |
| 10,762,093 | B1 | 9/2020 | Gau et al. |
| 10,908,970 | B1 | 2/2021 | Arivazhagan et al. |
| 11,269,913 | B1 | 3/2022 | Dervay et al. |
| 11,301,475 | B1 | 4/2022 | Lei et al. |
| 11,372,882 | B1 | 6/2022 | Dervay et al. |
| 12,056,144 | B2 | 8/2024 | Dervay et al. |
| 2011/0270857 | A1 | 11/2011 | Bommireddipalli et al. |
| 2012/0030181 | A1 | 2/2012 | Adhiraju et al. |
| 2012/0110011 | A1 | 5/2012 | Allen et al. |
| 2014/0281548 | A1* | 9/2014 | Boyer ..................... H04L 63/06 713/171 |
| 2016/0103601 | A1 | 4/2016 | Steinfl et al. |
| 2016/0173331 | A1 | 6/2016 | Janke et al. |
| 2018/0081702 | A1 | 3/2018 | Cohen et al. |
| 2022/0414114 | A1 | 12/2022 | Dervay et al. |

OTHER PUBLICATIONS

Microsoft Computer Dictionary, 5th Edition, Microsoft Press, Redmond, WA, © 2002, p. 31.*
"Microsoft Computer Dictionary", 5th Edition, Microsoft Press, Redmond, WA, (2002), 7 pgs.
"U.S. Appl. No. 17/463,261, Notice of Allowance mailed Dec. 21, 2021", 10 pgs.
"U.S. Appl. No. 17/649,415, Notice of Allowance mailed Apr. 12, 2022", 10 pgs.
"U.S. Appl. No. 17/649,415, Corrected Notice of Allowability mailed May 2, 2022", 2 pgs.
"U.S. Appl. No. 17/804,660, Non Final Office Action mailed Sep. 28, 2023", 19 pgs.
"U.S. Appl. No. 17/804,660, Response filed Dec. 21, 2023 to Non Final Office Action mailed Sep. 28, 2023", 17 pgs.
"U.S. Appl. No. 17/804,660, Notice of Allowance mailed Mar. 27, 2024", 15 pgs.
Chandra, Ramesh, "Separating Web Applications from User Data Storage with BSTORE", USENIX Conference on Web Application Development, WebApps 10 Boston MA, (Jun. 23-24, 2010), 13 pages.
Friedow, Christian, "Integrating IoT Devices into Business Processes", CAiSE 2018 Workshops, LNBIP 316, Tallinn, Estonia, (Jun. 11-15, 2018), 285-2900, 14 pages.
Goldfedder, Jarrett, "Building a Data Integration Team: Skills, Requirements, and Solutions for Designing Integrations", Chapter 5: Choosing an ETL Apress Media LLC, first online, (Feb. 28, 2020), 75-101.
Lubrano, Francesco, "Multinetwork Technology Cloud-Based Asset-Tracking Platform for IoT Devices", CISIS 2020, AISC 1194, Lodz, Poland, First Online: Jun. 11, 2020, (Jun. 11, 2020), 344-354.
Oreizy, Peyman, "Architecture-based runtime software evolution", ICSE 1998, Kyoto, Japan, (Apr. 19-25, 1998), 177-186.
Rasche, Andreas, "Configuration and Dynamic Reconfiguration of Component-based Applications with Microsoft . Net", ISORC, Hokkaido, Japan,, (May 16, 2003), 164-171.
Schiefer, Josef, "Container-Managed ETL Applications for Integrating Data in Real-Time", 24th International Conference on Information Systems, (2003), 13 pages.
Sreemathy, J, "Overview of ETL Tools and Talend-Data Integration", ICACCS 2021, Coimbatore, India, (Mar. 19-20, 2021), 1650-1654.
U.S. Appl. No. 17/463,261 U.S. Pat. No. 11,269,913, filed Aug. 31, 2021, Reverse Extract, Transform, Load (ETL) Tool.
U.S. Appl. No. 17/649,415 U.S. Pat. No. 11,372,882, filed Jan. 31, 2022, Reverse Extract, Transform, Load (ETL) Tool.
U.S. Appl. No. 17/804,660 U.S. Pat. No. 12,056,144, filed May 31, 2022, Application Update Configuration Using an Application Connector.

* cited by examiner

```
{
    "QUERY"   : "SELECT SR.ACCOUNT_ID, SR.APS FROM SALES.APS_BASIC.SMOKE_REPORT SR WHERE 1=1 ORDER BY 1 ASC;",
    "OBJECT"  : "ACCOUNT",
    "KEY"     : "ID",
    "FIELDS"  : ["ID","APS_C"]
}
```

FIG. 6

CONFIGURATION OF APPLICATION DATA OBJECT UPDATES

PRIORITY CLAIM

This application is a Continuation of U.S. patent application Ser. No. 17/804,660, filed May 31, 2022, entitled "APPLICATION UPDATE CONFIGURATION USING AN APPLICATION CONNECTOR," which is a Continuation of U.S. patent application Ser. No. 17/649,415, filed Jan. 31, 2022, entitled "REVERSE EXTRACT, TRANSFORM, LOAD (ETL) TOOL," and now issued as U.S. Pat. No. 11,372,882, which is a Continuation of U.S. patent application Ser. No. 17/463,261, filed Aug. 31, 2021, entitled "REVERSE EXTRACT, TRANSFORM, LOAD (ETL) TOOL" and now issued as U.S. Pat. No. 11,269,913; which claims the benefit of priority to U.S. Provisional Patent Application No. 63/202,801, filed Jun. 24, 2021, entitled "REVERSE EXTRACT, TRANSFORM, LOAD (ETL) TOOL," which applications are incorporated herein by reference in their entireties.

TECHNICAL FIELD

Embodiments of the disclosure relate generally to databases and, more specifically, to a reverse extract-transform-load (ETL) tool (e.g., an application connector) associated with cloud services of a database system.

BACKGROUND

Databases are widely used for data storage and access in computing applications. A goal of database storage is to provide enormous sums of information in an organized manner so that it can be accessed, managed, updated, and shared. In a database, data may be organized into rows, columns, and tables. Databases are used by various entities and companies for storing information that may need to be accessed or analyzed.

BRIEF DESCRIPTION OF THE DRAWINGS

The present disclosure will be understood more fully from the detailed description given below and from the accompanying drawings of various embodiments of the disclosure.

FIG. 6 illustrates example connector configuration information associated with an application connector used by a reverse ETL manager for updating an application, in accordance with some embodiments of the present disclosure.

DETAILED DESCRIPTION

Figure 1:
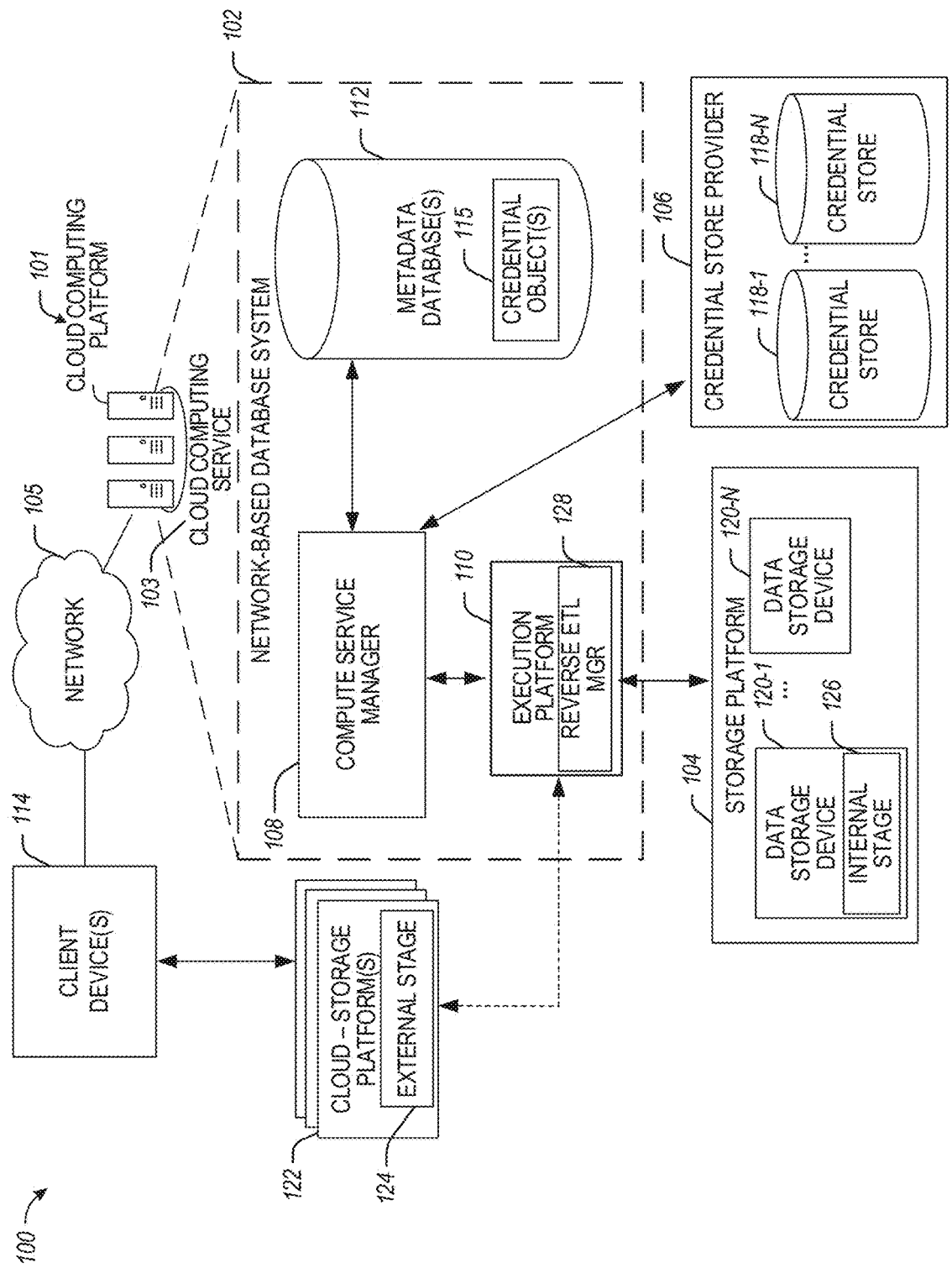
FIG. 1 illustrates an example computing environment that includes a network-based database system in communication with a cloud storage platform, in accordance with some embodiments of the present disclosure.

Reference will now be made in detail to specific example embodiments for carrying out the inventive subject matter. Examples of these specific embodiments are illustrated in the accompanying drawings, and specific details are outlined in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

In the present disclosure, physical units of data that are stored in a data platform—and that make up the content of, e.g., database tables in customer accounts—are referred to as micro-partitions. In different implementations, a data platform may store metadata in micro-partitions as well. The term "micro-partitions" is distinguished in this disclosure from the term "files," which, as used herein, refers to data units such as image files (e.g., Joint Photographic Experts Group (JPEG) files, Portable Network Graphics (PNG) files, etc.), video files (e.g., Moving Picture Experts Group (MPEG) files, MPEG-4 (MP4) files, Advanced Video Coding High Definition (AVCHD) files, etc.), Portable Document Format (PDF) files, documents that are formatted to be compatible with one or more word-processing applications, documents that are formatted to be compatible with one or more spreadsheet applications, and/or the like. If stored internal to the data platform, a given file is referred to herein as an "internal file" and may be stored in (or at, or on, etc.) what is referred to herein as an "internal storage location." If stored external to the data platform, a given file is referred to herein as an "external file" and is referred to as being stored in (or at, or on, etc.) what is referred to herein as an "external storage location." These terms are further discussed below.

Computer-readable files come in several varieties, including unstructured files, semi-structured files, and structured files. These terms may mean different things to different people. As used herein, examples of unstructured files include image files, video files, PDFs, audio files, and the like; examples of semi-structured files include JavaScript Object Notation (JSON) files, eXtensible Markup Language (XML) files, and the like; and examples of structured files include Variant Call Format (VCF) files, Keithley Data File (KDF) files, Hierarchical Data Format version 5 (HDF5) files, and the like. As known to those of skill in the relevant arts, VCF files are often used in the bioinformatics field for storing, e.g., gene-sequence variations, KDF files are often used in the semiconductor industry for storing, e.g., semiconductor-testing data, and HDF5 files are often used in industries such as the aeronautics industry, in that case for storing data such as aircraft-emissions data. Numerous other example unstructured-file types, semi-structured-file types, and structured-file types, as well as example uses thereof, could certainly be listed here as well and will be familiar to those of skill in the relevant arts. Different people of skill in the relevant arts may classify types of files differently among these categories and may use one or more different categories instead of or in addition to one or more of these.

Aspects of the present disclosure provide techniques for aligning applications (e.g., software-as-a-service (SaaS) applications) with the source of truth information. For example, a storage platform (including, e.g., a database or other storage devices) can be shared between multiple applications. Data of a first application may be maintained/stored by the storage platform and may be a source of truth data for a second application. A reverse ETL manager may be configured to perform the disclosed techniques (e.g., using an application connector or an external function) to obtain (or extract) the source of truth data from the storage platform, transform the data (if needed), and store (or load) the data into the application layer (e.g., store it in the second application including updating one or more objects of the second application using the data obtained from the storage platform). In this regard, the storage platform becomes a hub and central source of truth for all SaaS applications. Additionally, the disclosed techniques may be used to generate new data at the storage platform and load the data into the application layer (e.g., update one or more of the applications associated with the storage platform with the generated new data).

The various embodiments that are described herein are described with reference where appropriate to one or more of the various figures. An example computing environment using a reverse ETL manager for updating applications by writing data from database storage (e.g., a storage location shared by multiple applications) to the application layer is discussed in connection with FIGS. 1-3. Example configuration and functions associated with a reverse ETL manager are discussed in connection with FIGS. 4-8. A more detailed discussion of example computing devices that may be used is provided in connection with FIG. 9.

FIG. 1 illustrates an example computing environment 100 that includes a database system in the example form of a network-based database system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform. For example, in some aspects, the computing environment 100 may include a cloud computing platform 101 with the network-based database system 102, a storage platform 104 (also referred to as a cloud storage platform), and credential store provider 106. The cloud computing platform 101 provides computing resources and storage resources that may be acquired (purchased) or leased and configured to execute applications and store data.

The cloud computing platform 101 may host a cloud computing service 103 that facilitates storage of data on the cloud computing platform 101 (e.g., data management and access) and analysis functions (e.g. SQL queries, analysis), as well as other processing capabilities (e.g., performing reverse ETL functions described herein). The cloud computing platform 101 may include a three-tier architecture: data storage (e.g., storage platforms 104 and 122), an execution platform 110 (e.g., providing query processing), and a compute service manager 108 providing cloud services.

It is often the case that organizations that are customers of a given data platform also maintain data storage (e.g., a data lake) that is external to the data platform (i.e., one or more external storage locations). For example, a company could be a customer of a particular data platform and also separately maintain storage of any number of files—be they unstructured files, semi-structured files, structured files, and/or files of one or more other types—on, as examples, one or more of their servers and/or on one or more cloud-storage platforms such as AMAZON WEB SERVICES™ (AWS™), MICROSOFT® AZURE®, GOOGLE CLOUD PLATFORM™, and/or the like. The customer's servers and cloud-storage platforms are both examples of what a given customer could use as what is referred to herein as an external storage location. The cloud computing platform 101 could also use a cloud-storage platform as what is referred to herein as an internal storage location concerning the data platform.

From the perspective of the network-based database system 102 of the cloud computing platform 101, one or more files that are stored at one or more storage locations are referred to herein as being organized into one or more of what is referred to herein as either "internal stages" or "external stages." Internal stages are stages that correspond to data storage at one or more internal storage locations, and where external stages are stages that correspond to data storage at one or more external storage locations. In this regard, external files can be stored in external stages at one or more external storage locations, and internal files can be stored in internal stages at one or more internal storage locations, which can include servers managed and controlled by the same organization (e.g., company) that manages and controls the data platform, and which can instead or in addition include data-storage resources operated by a storage provider (e.g., a cloud-storage platform) that is used by the data platform for its "internal" storage. The internal storage of a data platform is also referred to herein as the "storage platform" of the data platform. It is further noted that a given external file that given customer stores at a given external storage location may or may not be stored in an external stage in the external storage location—i.e., in some data-platform implementations, it is a customer's choice whether to create one or more external stages (e.g., one or more external-stage objects) in the customer's data-platform account as an organizational and functional construct for conveniently interacting via the data platform with one or more external files.

As shown, the network-based database system 102 of the cloud computing platform 101 is in communication with the cloud storage platforms 104 and 122 (e.g., AWS®, Microsoft Azure Blob Storage®, or Google Cloud Storage), and a cloud credential store provider 106. The network-based database system 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services to multiple client accounts.

The compute service manager 108 coordinates and manages operations of the network-based database system 102. The compute service manager 108 also performs query optimization and compilation as well as managing clusters of computing services that provide compute resources (also referred to as "virtual warehouses"). The compute service manager 108 can support any number of client accounts such as end-users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based database system 102. A user may utilize the client device 114 to submit data storage, retrieval, and analysis requests to the compute service manager 108. Client device 114 (also referred to as user device 114) may include one or more of a laptop computer, a desktop computer, a mobile phone (e.g., a smartphone), a tablet computer, a cloud-hosted computer, cloud-hosted serverless processes, or other computing processes or devices may be used to access services provided by the cloud computing platform 101 (e.g., cloud computing service 103) by way of a network 105, such as the Internet or a private network.

In the description below, actions are ascribed to users, particularly consumers and providers. Such actions shall be understood to be performed concerning client device (or devices) 114 operated by such users. For example, notification to a user may be understood to be a notification transmitted to client device 114, input or instruction from a user may be understood to be received by way of the client device 114, and interaction with an interface by a user shall be understood to be interaction with the interface on the client device 114. In addition, database operations (joining, aggregating, analysis, etc.) ascribed to a user (consumer or provider) shall be understood to include performing such actions by the cloud computing service 103 in response to an instruction from that user.

The compute service manager 108 is also coupled to one or more metadata databases 112 that store metadata about various functions and aspects associated with the network-based database system 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device.

As another example, a metadata database 112 can store one or more credential objects 115. In general, a credential object 115 indicates one or more security credentials to be retrieved from a remote credential store. For example, the credential store provider 106 maintains multiple remote credential stores 118-1 to 118-N. Each of the remote credential stores 118-1 to 118-N may be associated with a user account and may be used to store security credentials associated with the user account. A credential object 115 can indicate one or more security credentials to be retrieved by the compute service manager 108 from one of the remote credential stores 118-1 to 118-N (e.g., for use in accessing data stored by the storage platform 104).

The compute service manager 108 is further coupled to the execution platform 110, which provides multiple computing resources that execute various data storage and data retrieval tasks. The execution platform 110 is coupled to storage platform 104 and cloud storage platforms 122. The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid-state drives (SSDs), storage clusters, Amazon S3™ storage systems, or any other data-storage technology. Additionally, the cloud storage platform 104 may include distributed file systems (such as Hadoop Distributed File Systems (HDFS)), object storage systems, and the like. In some embodiments, at least one internal stage 126 may reside on one or more of the data storage devices 120-1-120-N, and at least one external stage 124 may reside on one or more of the cloud storage platforms 122.

The execution platform 110 comprises a plurality of compute nodes. In some embodiments, one or more of the execution nodes of the execution platform 110 can be configured with a reverse ETL manager 128 performing the disclosed functionalities. More specifically, the reverse ETL manager 128 is configured with one or more application connectors and/or one or more external functions for writing data from a storage location back to the application layer (e.g., writing data from the storage location to one or more applications associated with the application layer). A more detailed description of the reverse ETL manager 128 and the functions it may perform is provided in connection with FIGS. 4-8.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-Networks) coupled to one another. In alternate embodiments, these communication links are implemented using any type of communication medium and any communication protocol.

The compute service manager 108, metadata database(s) 112, execution platform 110, and storage platform 104, are shown in FIG. 1 as individual discrete components. However, each of the compute service manager 108, metadata database(s) 112, execution platform 110, and storage platform 104 may be implemented as a distributed system (e.g., distributed across multiple systems/platforms at multiple geographic locations). Additionally, each of the compute service manager 108, metadata database(s) 112, execution platform 110, and storage platform 104 can be scaled up or down (independently of one another) depending on changes to the requests received and the changing needs of the network-based database system 102. Thus, in the described embodiments, the network-based database system 102 is dynamic and supports regular changes to meet the current data processing needs.

During typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the cloud computing platform 101 of the computing environment 100 separates the execution platform 110 from the storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
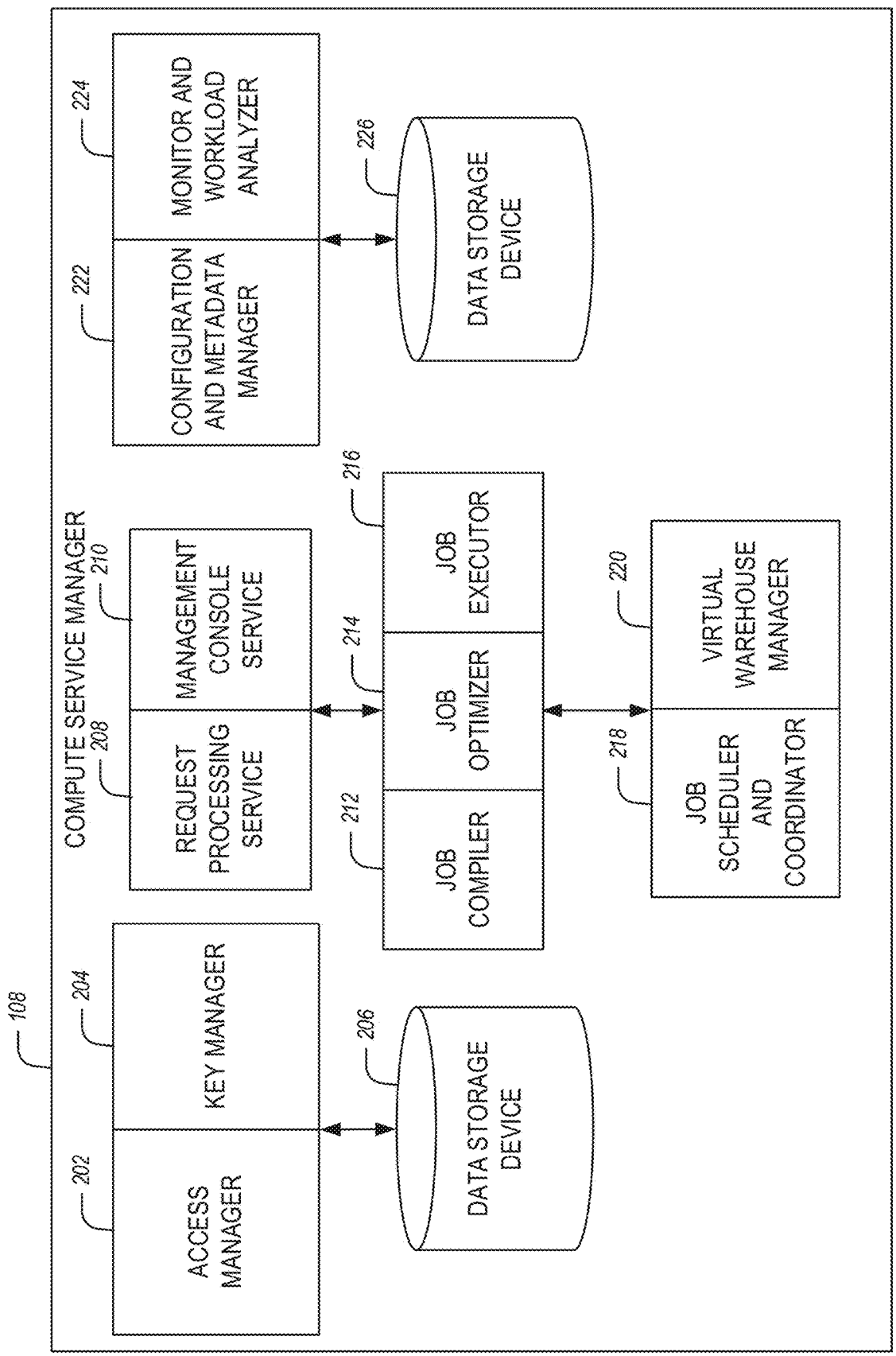
FIG. 2 is a block diagram illustrating the components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a credential management system 204 coupled to an access metadata database 206, which is an example of the metadata database(s) 112. Access manager 202 handles authentication and authorization tasks for the systems described herein. The credential management system 204 facilitates the use of remotely stored credentials (e.g., credentials stored in one of the remote credential stores 118-1 to 118-N) to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store (e.g., one or more of the remote credential stores 118-1 to 118-N) and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. Job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries.

Additionally, the compute service manager 108 includes a configuration and metadata manager 222, which manages the information related to the data stored in the remote data storage devices and the local buffers (e.g., the buffers in execution platform 110). The configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. The data storage device 226 in FIG. 2 represents any data storage device within the network-based database system 102. For example, data storage device 226 may represent buffers in execution platform 110, storage devices in storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1 may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

Figure 3:
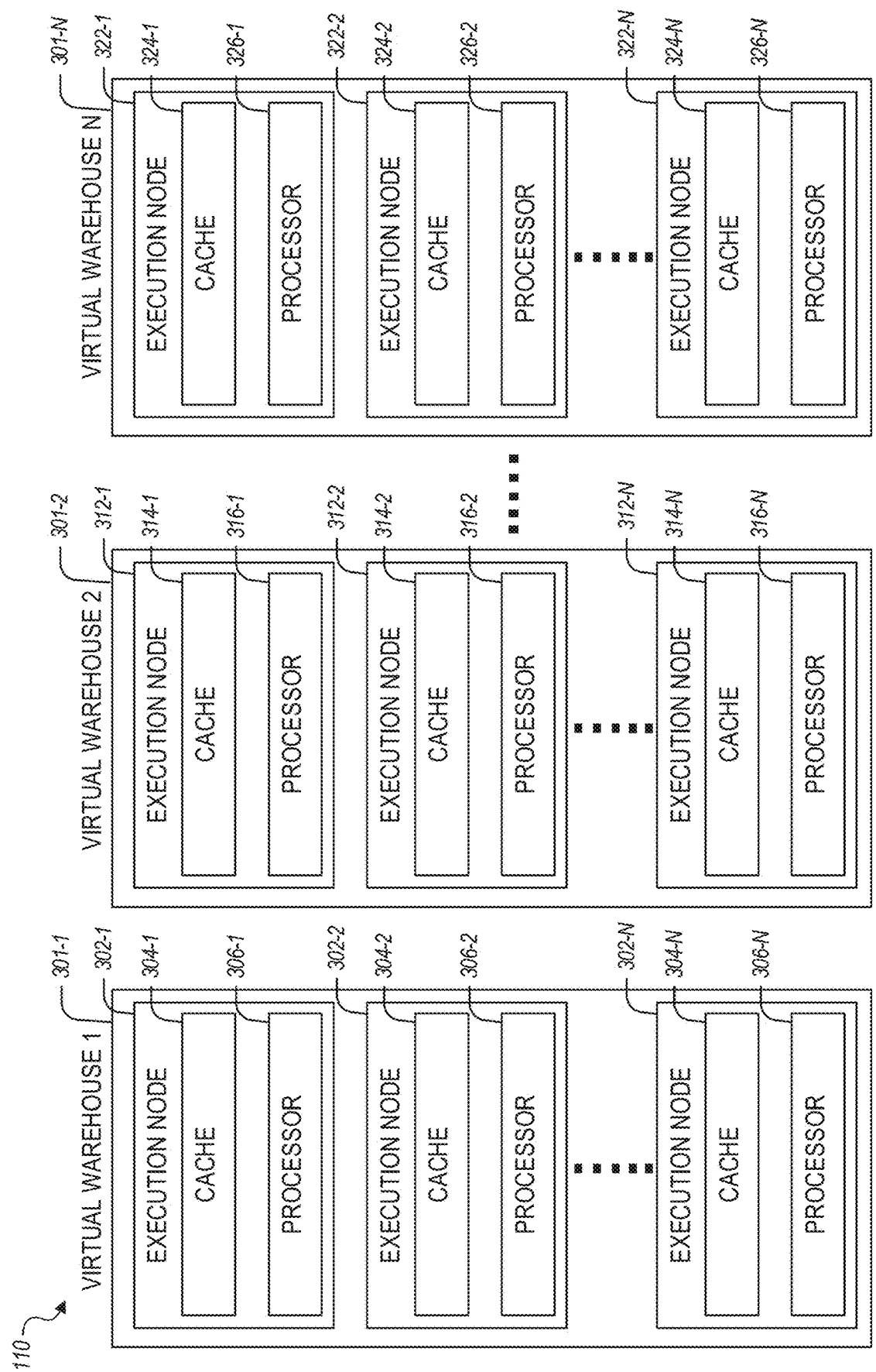
FIG. 3 is a block diagram illustrating components of an execution platform, in accordance with some embodiments of the present disclosure.

FIG. 3 is a block diagram illustrating components of the execution platform 110, in accordance with some embodiments of the present disclosure. As shown in FIG. 3, the execution platform 110 includes multiple virtual warehouses, including virtual warehouse 1 (or 301-1), virtual warehouse 2 (or 301-2), and virtual warehouse N (or 301-N). Each virtual warehouse includes multiple execution nodes that each include a data cache and a processor. The virtual warehouses can execute multiple tasks in parallel by using multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in the cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in the cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with the same execution platform 110, virtual warehouses 1, . . . , N may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location, and execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault-tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in the cloud storage platform 104, but each virtual warehouse has its execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

In some embodiments, at least one of the execution nodes of execution platform 110 is configured with the reverse ETL manager 128. For example, a more detailed description of execution node 302-1 configured with reverse ETL manager 128 is provided in connection with FIG. 4. Additional reverse ETL managers may also be configured in other execution nodes of the execution platform 110. Even though FIG. 4 illustrates the reverse ETL manager 128 configured as part of an execution node, the disclosure is not limited in this regard, and the reverse ETL manager 128 may be configured as part of the compute service manager 108 or as part of a stand-alone node within the network-based database system 102.

Figure 4:
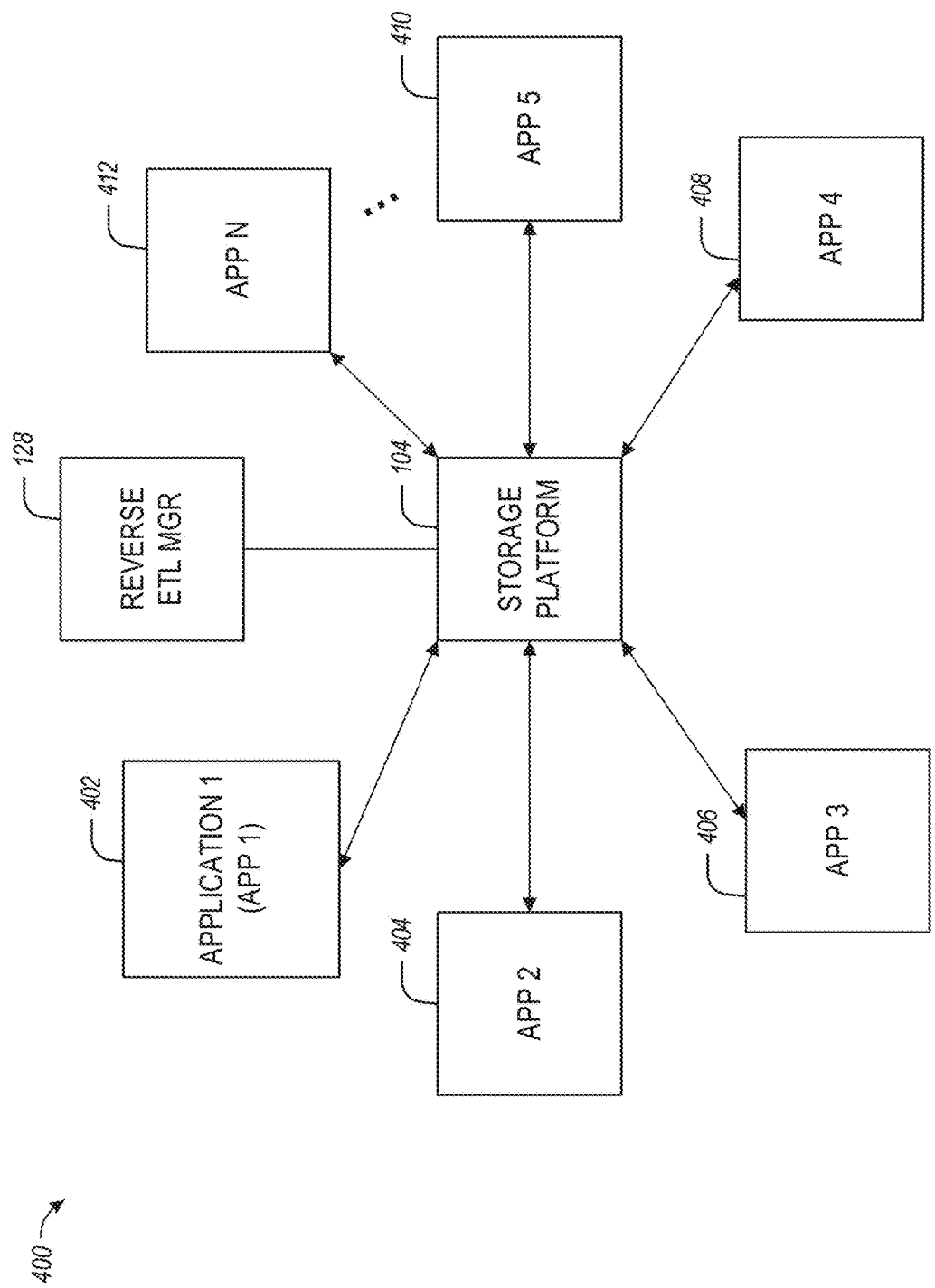
FIG. 4 is a diagram of a storage platform shared by a plurality of applications and used by a reverse ETL manager, in accordance with some embodiments of the present disclosure.

FIG. 4 is a diagram 400 of a storage platform shared by a plurality of applications and used by a reverse ETL manager, in accordance with some embodiments of the present disclosure. Referring to FIG. 4, the storage platform 104 can be configured as a storage repository (e.g., as shared storage) for SaaS applications (or apps) 402, 404, 406, 408, 410, . . . , 412, which may be configured for use within the cloud computing platform 101. As illustrated in FIG. 4, the storage platform 104 can be used as the central source of truth, storing application data from each of apps 402, . . . , 412. The reverse ETL manager 128 may be configured to use an application connector or an external function to obtain (or extract) the source of truth data from the storage platform 104, transform the data (if needed), and store (or load) the data into the application layer (e.g., store it in the second application including updating one or more objects of the second application using the data obtained from the storage platform). In this regard, the storage platform 104 becomes a hub and central source of truth for the SaaS applications 402, . . . , 412.

Figure 5:
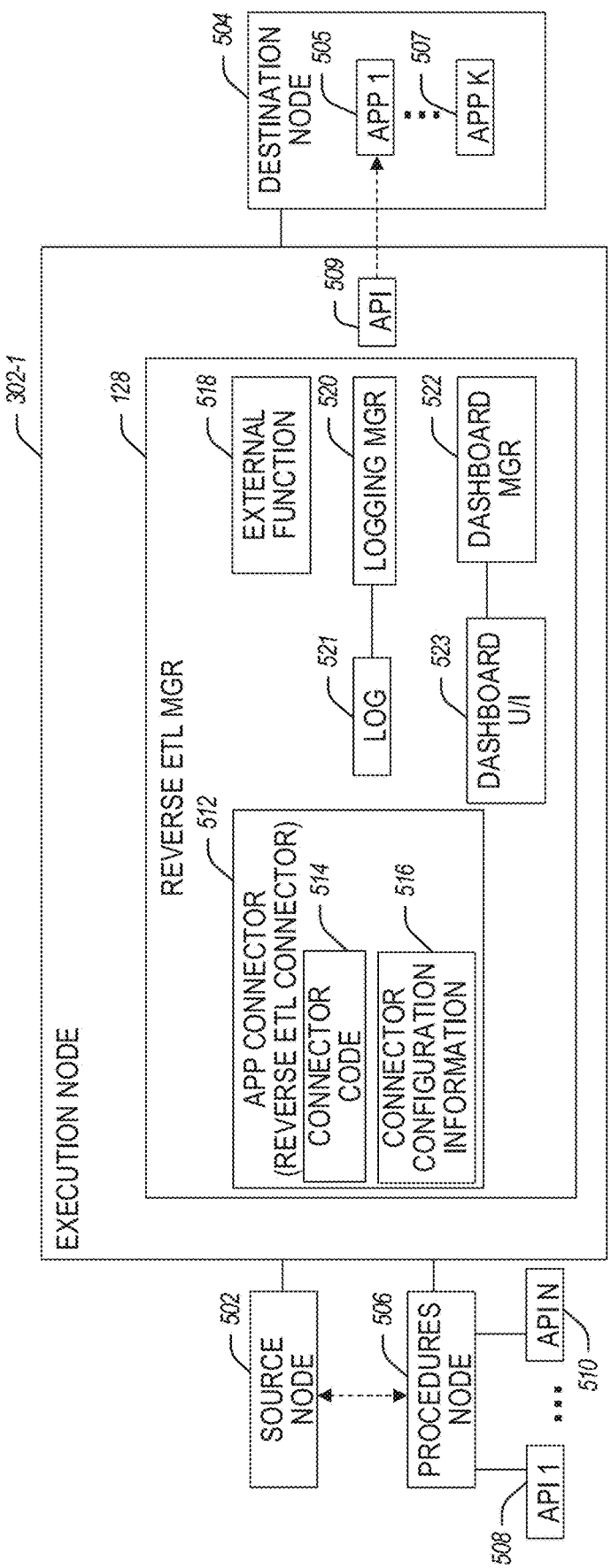
FIG. 5 is a block diagram of an execution node configured with a reverse ETL manager, in accordance with some embodiments of the present disclosure.

FIG. 5 is a block diagram of an execution node 302-1 configured with a reverse ETL manager 128, in accordance with some embodiments of the present disclosure. Referring to FIG. 5, the reverse ETL manager 128 comprises suitable circuitry, interfaces, and/or code and is configured to perform reverse ETL functions discussed herein (e.g., using an application connector 512 and/or external function 518).

In some embodiments, the reverse ETL manager 128 may be configured with an application connector 512, which may be used for generalizing and writing data from a data warehouse (e.g., a storage device associated with the storage platform 104) as well as create or update application objects (e.g., one or more objects of a SaaS application) using the data from the data warehouse. In some embodiments, the application connector (also referred to as reverse ETL connector) 512 includes connector code 514 and connector configuration information 516. The connector configuration information 516 allows an end-user (e.g., a user of client device 114) to plug in a query and write the results of that query to specified fields on a specified object associated with a SaaS application (e.g., one of apps 402 . . . , 412 or one of apps 505, . . . , 507 executing on destination node 504).

In some embodiments, the connector configuration information 516 may be used (e.g., by a user or subscriber of the network-based database system 102) to plug in their query and define the fields and application objects for updating based on data from the storage platform. Example connector configuration information is illustrated in FIG. 6.

FIG. 6 illustrates example connector configuration information 600 associated with an application connector 512 used by the reverse ETL manager 128 for updating an application, in accordance with some embodiments of the present disclosure. Referring to FIG. 6, the connector configuration information 600 may include a query field, an object field, a key field, and an array of fields for updating.

The query field may be used (e.g., by an end-user or subscriber) for defining the query that returns results for write into the application layer as well as the unique key for the object to write to. In the example illustrated in FIG. 6, data will be pulled from sales. aps_basic.smoke_report, and data "aps" will be written onto the object "account."

The object field may be used for designating the application object for writing the result of the query. In the example connector configuration information 600, the query result will be written to the "account" application object.

The key field may be used for indicating an ID as a unique key that the application object update may be based on. Put another way, the key may be used for authorization and authentication functions.

The fields of the example connector configuration information 600 may be used for specifying an array of the fields that will be updated inside the application object of the application. In some embodiments, the first field may be the key. In some embodiments, the order of the columns in the query may match the order in the fields array.

In some embodiments, the connector configuration information 600 may be stored as a Jobs JavaScript Object Notation (JOBS.JSON) file. Additionally, the JOBS. JSON file may be configured as a directed acyclic graph (DAG) for execution In some embodiments, the connector code 514 may be executed to trigger the connection of the query in the connector configuration information 516 and updating the app (e.g., app 505) through its application programming interface (API) (e.g., API 509 associated with app 505).

Figure 7:
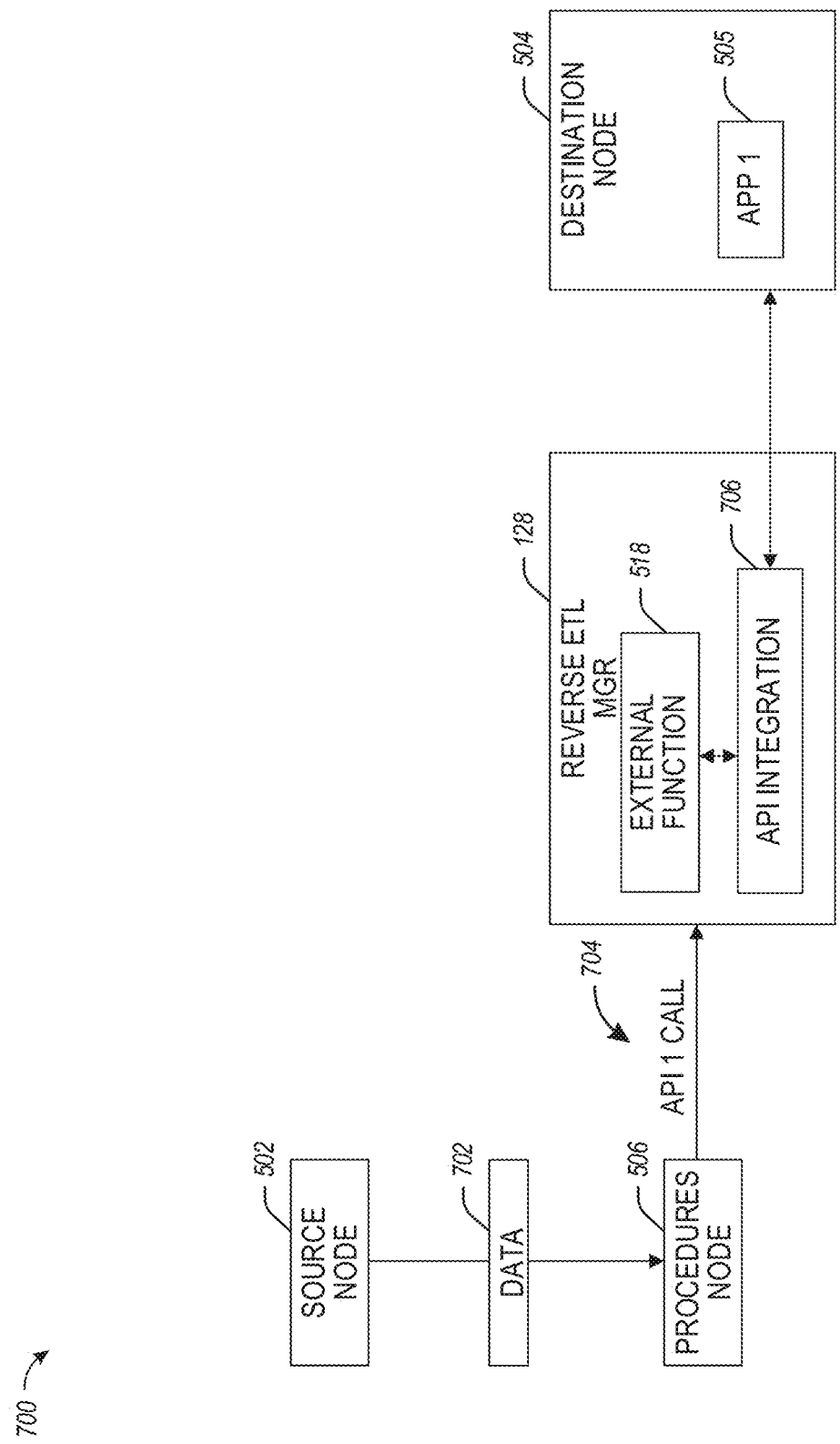
FIG. 7 is a block diagram of a reverse ETL manager configured with external functions for performing application updates, in accordance with some embodiments of the present disclosure.

FIG. 7 is a block diagram 700 of the reverse ETL manager 128 configured with external function 518 for performing application updates, in accordance with some embodiments of the present disclosure.

In some embodiments, the reverse ETL manager 128 uses the external function 518 to call an external API (e.g., one of APIs 508, . . . , 510 managed by procedures node 506) as API call 704. APIs 508, . . . 510 are referred to as "external APIs" because such APIs may be configured externally to the reverse ETL manager 128, externally to the execution node 302-1, externally to the storage platform 104, or externally to the cloud computing platform 101. In some embodiments, external APIs 508, . . . , 510 can be configured and managed via an external compute node (e.g., procedures node 506) that is separate from the execution node 302-1, the storage platform 104, or the cloud computing platform 101.

In some embodiments, the external function 518 may be executed to call the external API (e.g., API 508) for retrieving/processing data 702 stored at the source node 502. The processed data may be used for updating an app (e.g., an application object of app 505 executing on destination node 504) via the API integration 706.

In an example use case of the external function 518, a table may be updated for app 505. The reverse ETL manager 128 may retrieve the business app name (e.g., name of app 505) and the app system ID. After fetching the information associated with app 505, the external function 518 is used for API call 704 (e.g., call of external API 508) for updating one or more fields in an application object of app 505. In some aspects, the API call 704 is an API put call that is executed based on authenticating the app using the retrieved app name and app system ID. In some embodiments, the API call 704 is used for updating app data of app 505 using the app system ID and data 702 fetched/processed from the source node 502. In this regard, the external function 518 is used to invoke external APIs from within the procedures node 506 (which can be configured as SQL queries node) and obtain an API response into the query result.

In some embodiments, the external function 518 is configured as a user-defined function (UDF). The UDF may not contain its code, instead, it may call code that is stored and executed outside of the network-based database system 102. In this regard, the external function 518 allows for API integration 706 and invokes external APIs within one or more SQL queries to obtain a response from the API call into the query result. In some embodiments, the external function 518 may be configured as a Lambda function that may be created for the rest of API calls in the Amazon AWS Lambda environment. In some embodiments, API integration 706 is an object which may be used in connection with an Amazon AWS Lambda remote service for communication with the app 505 at the destination node 504. In some embodiments, the object may be used for storing the security details for connecting to the Lambda function.

In some embodiments, the reverse ETL manager is configured with a logging manager 520 and a dashboard manager 522. The logging manager 520 comprises suitable circuitry, interfaces, and/or code and is configured to maintain one or more logs (such as log 521). For example, the logging manager 520 may update log 521 with any data updates pushed to an application (including old data that is being replaced by new data), time of update, a network location of a data source, a success indicator (indicating whether an application object update is successful or not). In some embodiments, the logging manager 520 may also update log 521 with information indicating whether an update/change of application data is allowed, information associated with the update requesting device/user, destination device hosting the application that is updated, related update approval flow, update approval policies, data sharing policies, etc.

In some embodiments, the dashboard manager 522 comprises suitable circuitry, interfaces, and/or code and is configured to maintain one or more dashboards (such as dashboard user interface (U/I) 523). The dashboard U/I 523 may be configured to track trends and changes on each object being modified, which information may be used to track the amount of data moving into the application layer, which application objects are impacted, etc.

Figure 8:
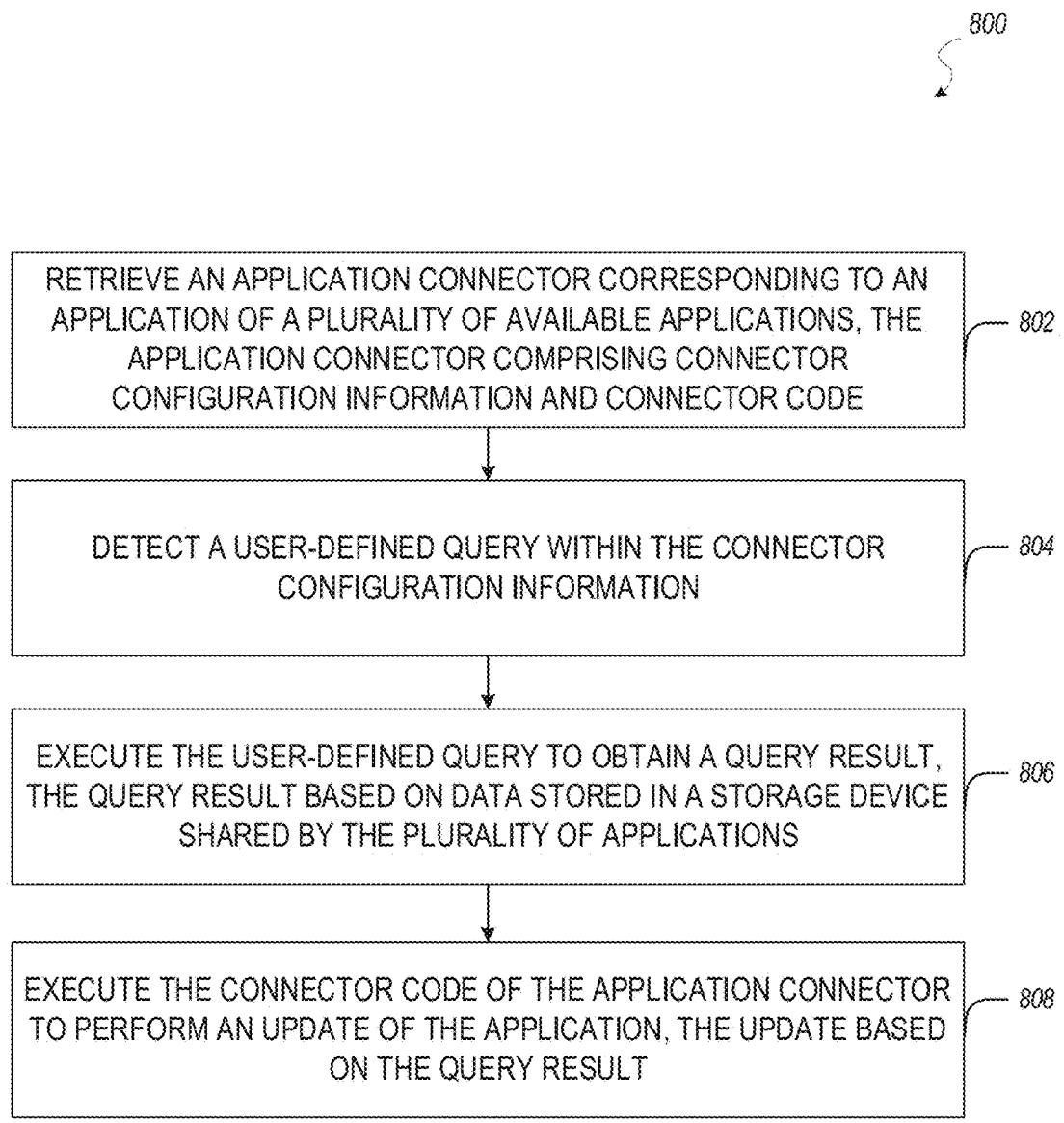
FIG. 8 is a flow diagram illustrating operations of a database system in performing a method for updating an application using a reverse ETL manager, in accordance with some embodiments of the present disclosure.

FIG. 8 is a flow diagram illustrating operations of a database system in performing a method 800 for updating an application using a reverse ETL manager, in accordance with some embodiments of the present disclosure.

Figure 9:
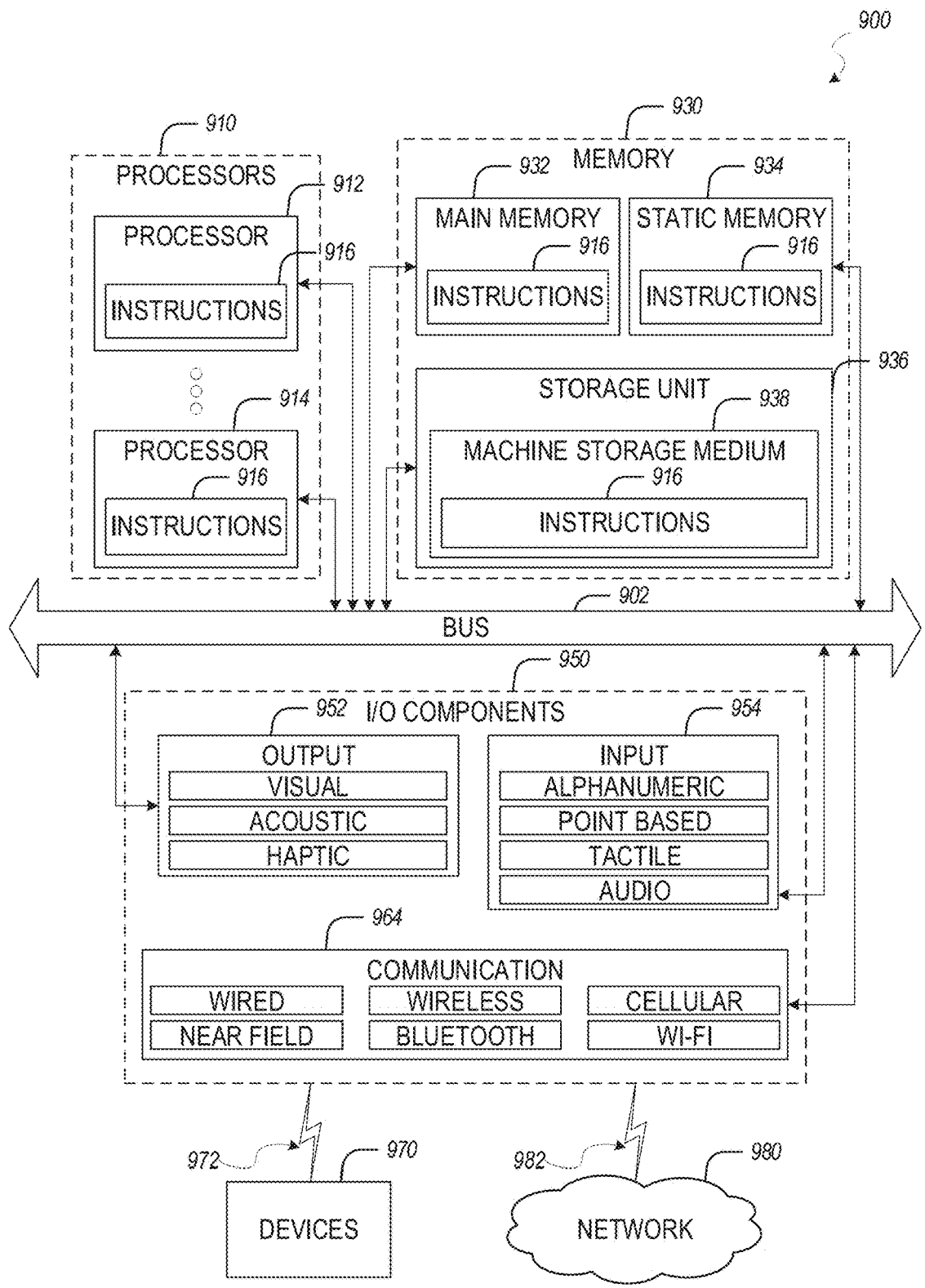
FIG. 9 illustrates a diagrammatic representation of a machine in the form of a computer system within which a set of instructions may be executed for causing the machine to perform any one or more of the methodologies discussed herein, in accordance with some embodiments of the present disclosure.

Method 800 may be embodied in computer-readable instructions for execution by one or more hardware components (e.g., one or more processors) such that the operations of the method 800 may be performed by components of network-based database system 102, such as components of the compute service manager 108 and/or the execution platform 110 (e.g., which may be implemented as machine 900 of FIG. 9). Accordingly, method 800 is described below, by way of example with reference thereto. However, it shall be appreciated that method 800 may be deployed on various other hardware configurations and is not intended to be limited to deployment within the network-based database system 102.

At operation 802, an application connector corresponding to an application of a plurality of available applications is retrieved. For example, the application connector 512 includes connector configuration information 516 and connector code 514. At operation 804, a user-defined query is detected within the connector configuration information. For example and as illustrated in FIG. 6, the connector configuration information 516 includes a query field with a user-defined query. At operation 806, the user-defined query is executed to obtain a query result. The query result may be based on data stored in a storage device shared by the plurality of applications. For example, the query may be executed on data stored by storage platform 104 shared between multiple apps. At operation 808, the connector code of the application connector is executed to perform an update of the application, the update based on the query result. For connector code 514 of the application connector 512 is executed to update an application object of app 505 via its API 509.

In some embodiments, an object identifier is detected within the connector configuration information 516, where the object identifier identifies an object of the application. In some embodiments, an application key is detected within the connector configuration information 516, where the application key authorizes access to the object. In some embodiments, a plurality of fields is detected within the connector configuration information 516, where the plurality of fields are associated with the object and are updated using the result of the query execution. In some embodiments, the application object is accessed using the application key, and the plurality of fields associated with the object is updated using the query result. In some embodiments, executing the connector code causes the update using an API of the application.

In some embodiments, a user-defined function is executed to invoke an API. The API may be an external API that is invoked via an application server. The application server may be external to the storage device. In some embodiments, invoking the API includes executing a second user-defined query to obtain a second query result, and performing a second update of the application based on the second query result. In some embodiments, the update and the second update of the application are logged in a log. In some embodiments, the log includes corresponding update confirmation indicators indicative of the success or failure of the update and the second update.

FIG. 9 illustrates a diagrammatic representation of a machine 900 in the form of a computer system within which a set of instructions may be executed for causing the machine 900 to perform any one or more of the methodologies discussed herein, according to an example embodiment. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example, instructions 916 may cause machine 900 to execute any one or more operations of method 800 (or any other technique discussed herein, for example in connection with FIG. 4-FIG. 8). As another example, instructions 916 may cause machine 900 to implement one or more portions of the functionalities discussed herein. In this way, instructions 916 may transform a general, non-programmed machine into a particular machine 900 (e.g., the compute service manager 108 or a node in the execution platform 110) that is specially configured to carry out any one of the described and illustrated functions in the manner described herein. In yet another embodiment, instructions 916 may configure the compute service manager 108 and/or a node in the execution platform 110 to carry out any one of the described and illustrated functions in the manner described herein.

In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a smartphone, a mobile device, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

Machine 900 includes processors 910, memory 930, and input/output (I/O) components 950 configured to communicate with each other such as via a bus 902. In some example embodiments, the processors 910 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 912 and a processor 914 that may execute the instructions 916. The term "processor" is intended to include multi-core processors 910 that may comprise two or more independent processors (sometimes referred to as "cores") that may execute instructions 916 contemporaneously. Although FIG. 9 shows multiple processors 910, the machine 900 may include a single processor with a single core, a single processor with multiple cores (e.g., a multi-core processor), multiple processors with a single core, multiple processors with multiple cores, or any combination thereof.

The memory 930 may include a main memory 932, a static memory 934, and a storage unit 936, all accessible to the processors 910 such as via the bus 902. The main memory 932, the static memory 934, and the storage unit 936 store the instructions 916 embodying any one or more of the methodologies or functions described herein. The instructions 916 may also reside, completely or partially, within the main memory 932, within the static memory 934, within machine storage medium 938 of the storage unit 936, within at least one of the processors 910 (e.g., within the processor's cache memory), or any suitable combination thereof, during execution thereof by the machine 900.

The I/O components 950 include components to receive input, provide output, produce output, transmit information, exchange information, capture measurements, and so on. The specific I/O components 950 that are included in a particular machine 900 will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light-emitting diode (LED) display, a liquid crystal display (LCD), a projector, or a cathode ray tube (CRT)), acoustic components (e.g., speakers), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures or other tactile input components), audio input components (e.g., a microphone), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, and other communication components to provide communication via other modalities. The device 970 may be another machine or any of a wide variety of peripheral devices (e.g., a peripheral device coupled via a universal serial bus (USB)). For example, as noted above, machine 900 may correspond to any one of the compute service manager 108 or the execution platform 110, and the devices 970 may include the client device 114 or any other computing device described herein as being in communication with the network-based database system 102 or the cloud storage platform 104.

The various memories (e.g., 930, 932, 934, and/or memory of the processor(s) 910 and/or the storage unit 936) may store one or more sets of instructions 916 and data structures (e.g., software) embodying or utilized by any one or more of the methodologies or functions described herein. These instructions 916, when executed by the processor(s) 910, cause various operations to implement the disclosed embodiments.

As used herein, the terms "machine-storage medium," "device-storage medium," and "computer-storage medium" mean the same thing and may be used interchangeably in this disclosure. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 980 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 916 may be transmitted or received over the network 980 using a transmission medium via a network interface device (e.g., a network interface component included in the communication components 964) and utilizing any one of several well-known transfer protocols (e.g., hypertext transfer protocol (HTTP)). Similarly, instructions 916 may be transmitted or received using a transmission medium via the coupling 972 (e.g., a peer-to-peer coupling) to the device 970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and include digital or analog communications signals or other intangible media to facilitate communication of such software. Hence, the terms "transmission medium" and "signal medium" shall be taken to include any form of a modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of method 800 may be performed by one or more processors. The performance of certain of the operations may be distributed among the one or more processors, not only residing within a single machine but also deployed across several machines. In some example embodiments, the processor or processors may be located in a single location (e.g., within a home environment, an office environment, or a server farm), while in other embodiments the processors may be distributed across several locations.

Described implementations of the subject matter can include one or more features, alone or in combination as illustrated below by way of examples.

Example 1 is a system comprising: at least one hardware processor; and at least one memory storing instructions that cause the at least one hardware processor to perform operations comprising: retrieving an application connector corresponding to an application of a plurality of available applications, the application connector comprising connector configuration information and connector code; detecting a user-defined query within the connector configuration information; executing the user-defined query to obtain a query result, the query result based on data stored in a storage device shared by the plurality of applications; and executing the connector code of the application connector to perform an update of the application based on the query result.

In Example 2, the subject matter of Example 1 includes subject matter where the instructions further cause the at least one hardware processor to perform operations comprising: detecting an object identifier within the connector configuration information, the object identifier identifying an object of the application.

In Example 3, the subject matter of Example 2 includes subject matter where the instructions further cause the at least one hardware processor to perform operations comprising: detecting an application key within the connector configuration information, the application key authorizing access to the object.

In Example 4, the subject matter of Example 3 includes subject matter where the instructions further cause the at least one hardware processor to perform operations comprising: detecting a plurality of fields within the connector configuration information, the plurality of fields associated with the object.

In Example 5, the subject matter of Example 4 includes subject matter where to perform the update, the instructions further cause the at least one hardware processor to perform operations comprising: accessing the object using the application key; and updating the plurality of fields associated with the object using the query result.

In Example 6, the subject matter of Examples 1-5 includes subject matter where executing the connector code causes the update using an application programming interface (API) of the application.

In Example 7, the subject matter of Examples 1-6 includes subject matter where the instructions further cause the at least one hardware processor to perform operations comprising: executing a user-defined function to invoke an application programming interface (API), wherein the API is invoked via an application server that is external to the system and the storage device.

In Example 8, the subject matter of Example 7 includes subject matter where invoking the API causes: execution of a second user-defined query to obtain a second query result; and a second update of the application based on the second query result.

In Example 9, the subject matter of Example 8 includes subject matter where the instructions further cause the at least one hardware processor to perform operations comprising: logging the update and the second update of the application in a log.

In Example 10, the subject matter of Example 9 includes subject matter where the log includes corresponding update confirmation indicators indicative of success or failure of the update and the second update.

Example 11 is a method comprising: retrieving an application connector corresponding to an application of a plurality of available applications, the application connector comprising connector configuration information and connector code; detecting a user-defined query within the connector configuration information; executing the user-defined query to obtain a query result, the query result based on data stored in a storage device shared by the plurality of applications; and executing the connector code of the application connector to perform an update of the application based on the query result.

In Example 12, the subject matter of Example 11 includes, detecting an object identifier within the connector configuration information, the object identifier identifying an object of the application.

In Example 13, the subject matter of Example 12 includes, detecting an application key within the connector configuration information, the application key authorizing access to the object.

In Example 14, the subject matter of Example 13 includes, detecting a plurality of fields within the connector configuration information, the plurality of fields associated with the object.

In Example 15, the subject matter of Example 14 includes, accessing the object using the application key; and updating the plurality of fields associated with the object using the query result.

In Example 16, the subject matter of Examples 11-15 includes subject matter where executing the connector code causes the update using an application programming interface (API) of the application.

In Example 17, the subject matter of Examples 11-16 includes, executing a user-defined function to invoke an application programming interface (API), wherein the API is invoked via an application server that is external to the storage device.

In Example 18, the subject matter of Example 17 includes subject matter where invoking the API comprises: executing a second user-defined query to obtain a second query result and performing a second update of the application based on the second query result.

In Example 19, the subject matter of Example 18 includes, logging the update and the second update of the application in a log.

In Example 20, the subject matter of Example 19 includes subject matter where the log includes corresponding update confirmation indicators indicative of success or failure of the update and the second update.

Example 21 is a computer-storage medium comprising instructions that, when executed by one or more processors of a machine, configure the machine to perform operations comprising: retrieving an application connector corresponding to an application of a plurality of available applications, the application connector comprising connector configuration information and connector code; detecting a user-defined query within the connector configuration information; executing the user-defined query to obtain a query result, the query result based on data stored in a storage device shared by the plurality of applications; and executing the connector code of the application connector to perform an update of the application based on the query result.

In Example 22, the subject matter of Example 21 includes, the operations further comprising: detecting an object identifier within the connector configuration information, the object identifier identifying an object of the application.

In Example 23, the subject matter of Example 22 includes, the operations further comprising: detecting an application key within the connector configuration information, the application key authorizing access to the object.

In Example 24, the subject matter of Example 23 includes, the operations further comprising: detecting a plurality of fields within the connector configuration information, the plurality of fields associated with the object.

In Example 25, the subject matter of Example 24 includes, the operations further comprising: accessing the object using the application key; and updating the plurality of fields associated with the object using the query result.

In Example 26, the subject matter of Examples 21-25 includes subject matter where executing the connector code causes the update using an application programming interface (API) of the application.

In Example 27, the subject matter of Examples 21-26 includes, the operations further comprising: executing a user-defined function to invoke an application programming interface (API), wherein the API is invoked via an application server that is external to the storage device.

In Example 28, the subject matter of Example 27 includes subject matter where invoking the API comprises: executing a second user-defined query to obtain a second query result and performing a second update of the application based on the second query result.

In Example 29, the subject matter of Example 28 includes, the operations further comprising: logging the update and the second update of the application in a log.

In Example 30, the subject matter of Example 29 includes subject matter where the log includes corresponding update confirmation indicators indicative of success or failure of the update and the second update.

Example 31 is at least one machine-readable medium including instructions that, when executed by processing circuitry, cause the processing circuitry to perform operations to implement any of Examples 1-30.

Example 32 is an apparatus comprising means to implement any of Examples 1-30.

Example 33 is a system to implement any of Examples 1-30.

Example 34 is a method to implement any of Examples 1-30.

Although the embodiments of the present disclosure have been described concerning specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is disclosed. Thus, although specific embodiments have been illustrated and described herein, it should be appreciated that any arrangement calculated to achieve the same purpose may be substituted for the specific embodiments shown. This disclosure is intended to cover any adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
    at least one hardware processor; and
    at least one memory storing instructions that cause the at least one hardware processor to perform operations comprising:
        retrieving configuration information associated with an application executing on a first computing node;
        performing an authentication of the application based on a secure identifier in the configuration information;
        causing execution of an application programming interface (API) to retrieve data from a second computing node based on a successful completion of the authentication; and
        updating a data object of the application with the retrieved data.

2. The system of claim 1, wherein the instructions further cause the at least one hardware processor to perform operations comprising:
    detecting an object identifier within the configuration information, the object identifier identifying an object of the application.

3. The system of claim 2, wherein the instructions further cause the at least one hardware processor to perform operations comprising:
    updating the object of the application using the data to perform the update of the application.

4. The system of claim 1, wherein the instructions further cause the at least one hardware processor to perform operations comprising:
    detecting an application key as the secure identifier in the configuration information, the application key authorizing access to the data object of the application.

5. The system of claim 4, wherein the application key comprises an application name and an application ID associated with the application.

6. The system of claim 4, wherein the instructions further cause the at least one hardware processor to perform operations comprising:

detecting a plurality of fields within the configuration information, the plurality of fields associated with the data object.

7. The system of claim 6, wherein to perform the updating, the instructions further cause the at least one hardware processor to perform operations comprising:
accessing the data object using the application key; and
updating the plurality of fields associated with the data object using the retrieved data.

8. The system of claim 1, wherein the instructions further cause the at least one hardware processor to perform operations comprising:
retrieving connector code associated with the application; and
executing the connector code to perform the updating of the data object.

9. The system of claim 8, wherein executing the connector code causes the updating via an application programming interface (API) of the application.

10. The system of claim 1, wherein the instructions further cause the at least one hardware processor to perform operations comprising:
logging the update of the data object in a log, wherein the log includes corresponding update confirmation indicators indicative of success or failure of the updating.

11. A method comprising:
retrieving, by at least one hardware processor, configuration information associated with an application executing on a first computing node;
performing an authentication of the application based on a secure identifier in the configuration information;
causing execution of an application programming interface (API) to retrieve data from a second computing node based on a successful completion of the authentication; and
updating a data object of the application with the retrieved data.

12. The method of claim 11, further comprising:
detecting an object identifier within the configuration information, the object identifier identifying an object of the application.

13. The method of claim 12, further comprising:
updating the object of the application using the data to perform the update of the application.

14. The method of claim 11, further comprising:
detecting an application key as the secure identifier in the configuration information, the application key authorizing access to the data object of the application.

15. The method of claim 14, wherein the application key comprises an application name and an application ID associated with the application.

16. The method of claim 14, further comprising:
detecting a plurality of fields within the configuration information, the plurality of fields associated with the data object.

17. The method of claim 16, wherein the updating further comprises:
accessing the data object using the application key; and
updating the plurality of fields associated with the data object using the retrieved data.

18. The method of claim 11, further comprising:
retrieving connector code associated with the application; and
executing the connector code to perform the updating of the data object.

19. The method of claim 18, wherein executing the connector code causes the updating via an application programming interface (API) of the application.

20. The method of claim 11, further comprising:
logging the update of the data object in a log, wherein the log includes corresponding update confirmation indicators indicative of success or failure of the updating.

21. A computer-storage medium comprising instructions that, when executed by one or more processors of a machine, configure the machine to perform operations comprising:
retrieving configuration information associated with an application executing on a first computing node;
performing an authentication of the application based on a secure identifier in the configuration information;
causing execution of an application programming interface (API) to retrieve data from a second computing node based on a successful completion of the authentication; and
updating a data object of the application with the retrieved data.

22. The computer-storage medium of claim 21, the operations comprising:
detecting an object identifier within the configuration information, the object identifier identifying an object of the application.

23. The computer-storage medium of claim 22, the operations comprising:
updating the object of the application using the data to perform the update of the application.

24. The computer-storage medium of claim 21, the operations comprising:
detecting an application key as the secure identifier in the configuration information, the application key authorizing access to the data object of the application.

25. The computer-storage medium of claim 24, wherein the application key comprises an application name and an application ID associated with the application.

26. The computer-storage medium of claim 24, the operations comprising:
detecting a plurality of fields within the configuration information, the plurality of fields associated with the data object.

27. The computer-storage medium of claim 26, wherein the operations for the updating further comprise:
accessing the data object using the application key; and
updating the plurality of fields associated with the data object using the retrieved data.

28. The computer-storage medium of claim 21, the operations comprising:
retrieving connector code associated with the application; and
executing the connector code to perform the updating of the data object.

29. The computer-storage medium of claim 28, wherein executing the connector code causes the updating via an application programming interface (API) of the application.

30. The computer-storage medium of claim 21, the operations comprising:
logging the update of the data object in a log, wherein the log includes corresponding update confirmation indicators indicative of success or failure of the updating.

* * * * *